United States Patent Office 3,524,679
Patented Aug. 18, 1970

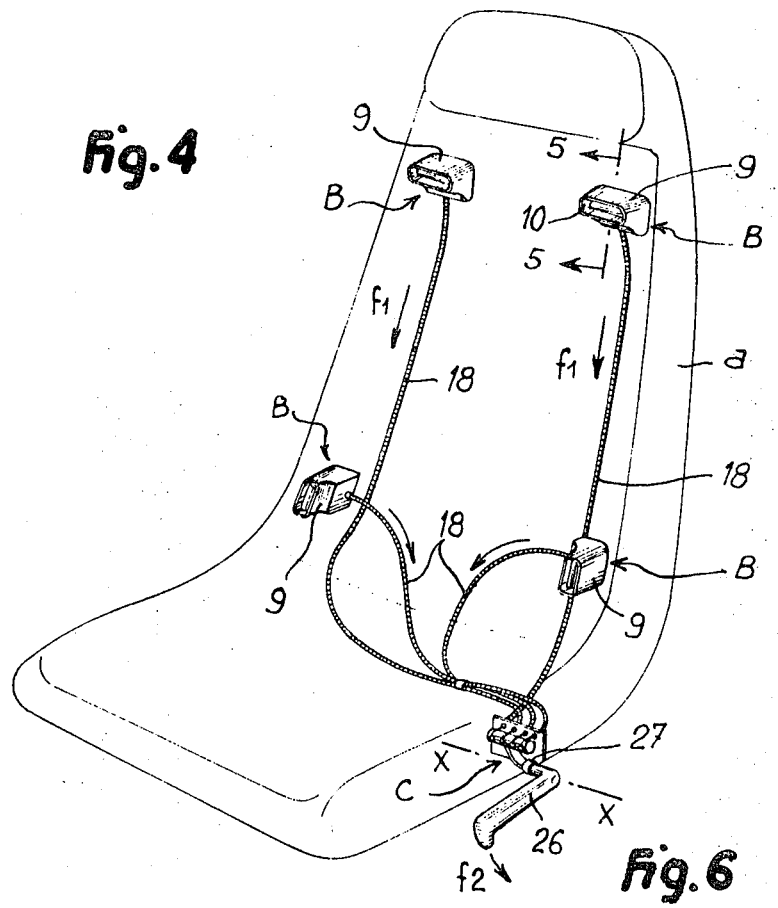
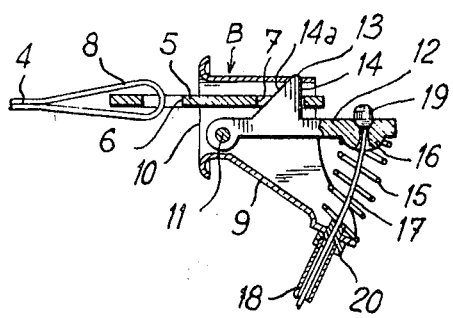
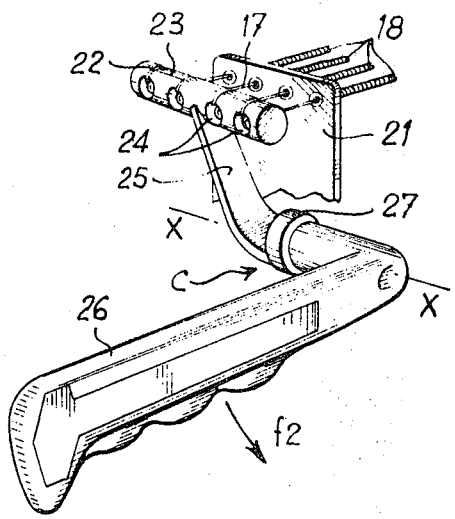

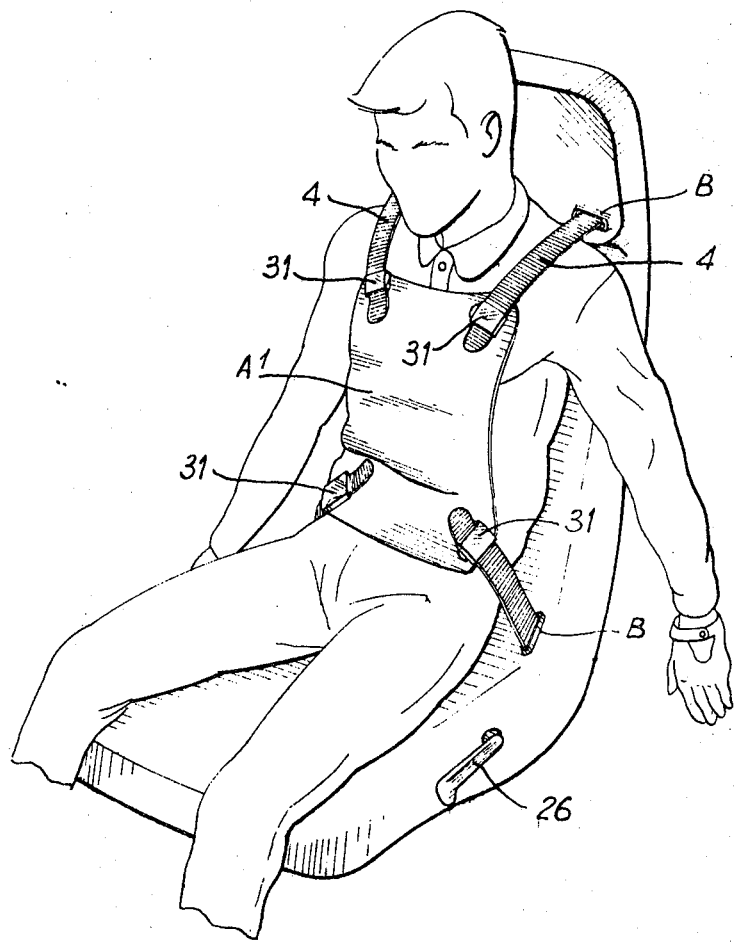

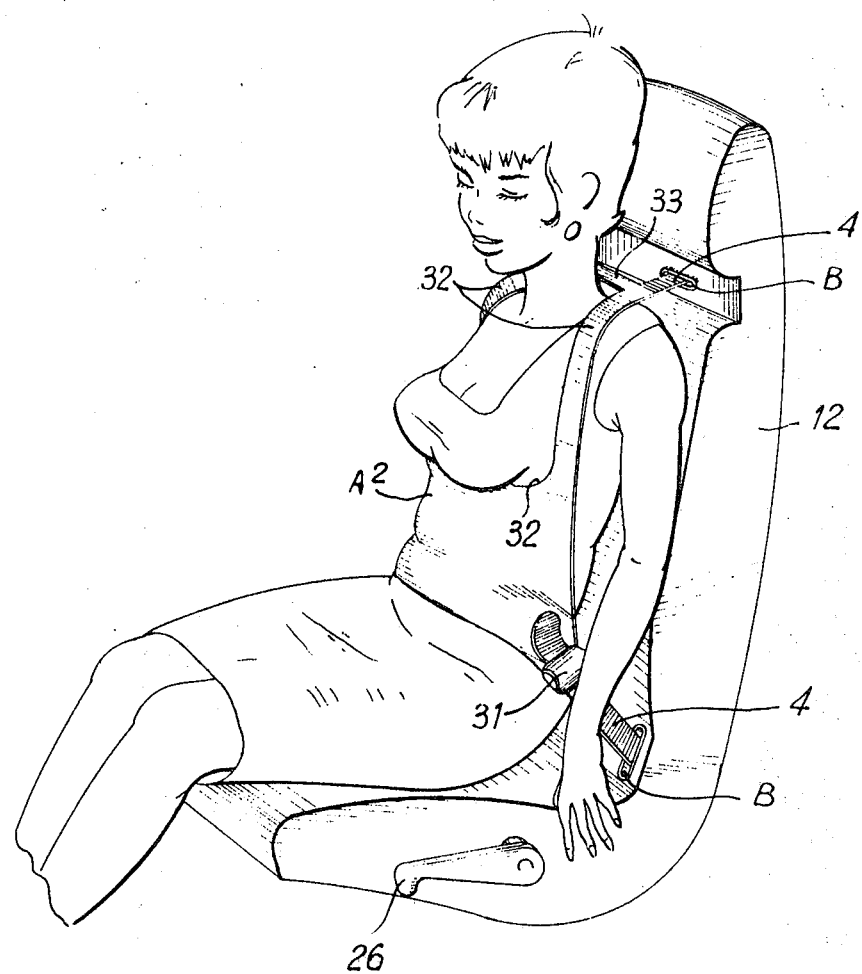

3,524,679
INDIVIDUAL RESTRAINING DEVICE FOR A VEHICLE USER
Hubert Y. de Lavenne, Meudon-Bellevue, France, assignor to Automobiles Peugeot, Paris, France, and Regie Nationale des Usines Renault, Billancourt, France, both French body corporates
Filed Apr. 15, 1968, Ser. No. 721,218
Int. Cl. A62b 35/00
U.S. Cl. 297—384     5 Claims

ABSTRACT OF THE DISCLOSURE

An individual safety device for a user who is seated on a seat of a vehicle, said device comprising in combination a clothing element or article consisting of at least a plastron provided in its four corners with four short straps each of which terminates at its free end in a fixing end element and, permanently disposed on the backrest of the seat of the vehicle, four devices which are complementary to said end elements for detachably fixing the latter to the seat.

---

The present invention relates to individual safety devices for a vehicle user (driver or passenger).

Known devices usually consist of safety belts the use of which has a tendency to become common in automobiles. However these belts have drawbacks:

Some people do not use their belt owing to the difficulty of correctly adjusting the belt or belts according to the corpulence or height of the user and the necessity for each user to be able to shift his seat forwardly or rearwardly and incline it to a varying extend, which modifies its distance from the attachment points of the belts since these belts are fixed to the body of the vehicle.

Further, the pressures set up by deceleration in the case of impact are distributed over small areas of the body of the user and can then be very high.

The object of the present invention is to remedy these drawbacks of belts, that is, to eliminate the unsightly and inconvenient belts in the vehicle and to distribute the pressures exerted in the case of impact over the largest possible area of the user.

The invention provides an individual safety device for an automobile user comprising in combination: a clothing element or article consisting of at least a plastron provided in its four corners with four short straps each of which terminates at its free end in a fixing end element and, permanently disposed on the backrest of the seat of the vehicle, four devices which are complementary to said end elements for detachably fixing the latter to the seat.

Preferably, the end elements consist of keepers whereas the fixing devices consist of the complementary parts of locks having retractable bolts.

According to another feature, the bolts or other movable unlocking elements of the end elements are all connected to a single actuating device whereby it is possible to withdraw them simultaneously in opposition to the action of individual elastically yieldable return devices.

According to one embodiment the clothing element consists of a windcheater or like article.

According to another embodiment, the clothing element is a simple plastron.

Further features and advantages of the invention will be apparent from the ensuing description with reference to the accompanying drawings.

In the drawings:

FIG. 4 is a diagrammatic perspective view of the seat with the complementary devices for the end elements of the straps and the single actuating device for simultaneously actuating the bolts of these complementary devices;

FIG. 5 is a sectional view, taken along line 5—5 of FIG. 4, on an enlarged scale, of one of these devices with its bolt and keeper, consisting of the end element of the strap which is held in position by the bolt;

FIG. 6 is a perspective view of the single actuating device on a scale greater than that of FIG. 4;

FIG. 9 is another perspective view of another modification in which the clothing element consists of a simple plastron and FIG. 10 is a view similar to FIG. 9 in the case of a plastron for a woman.

Figure 2:
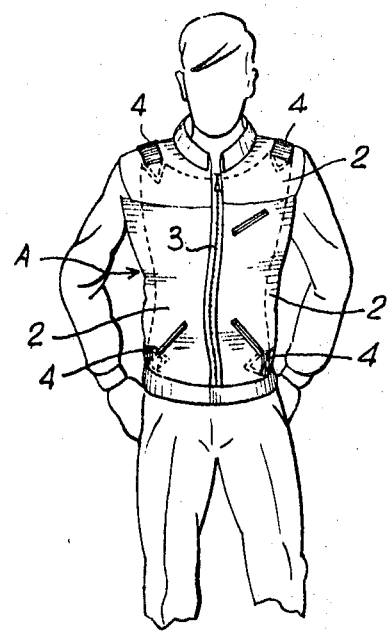
FIG. 2 is a front elevational view of said jacket on a smaller scale.
Figure 1:
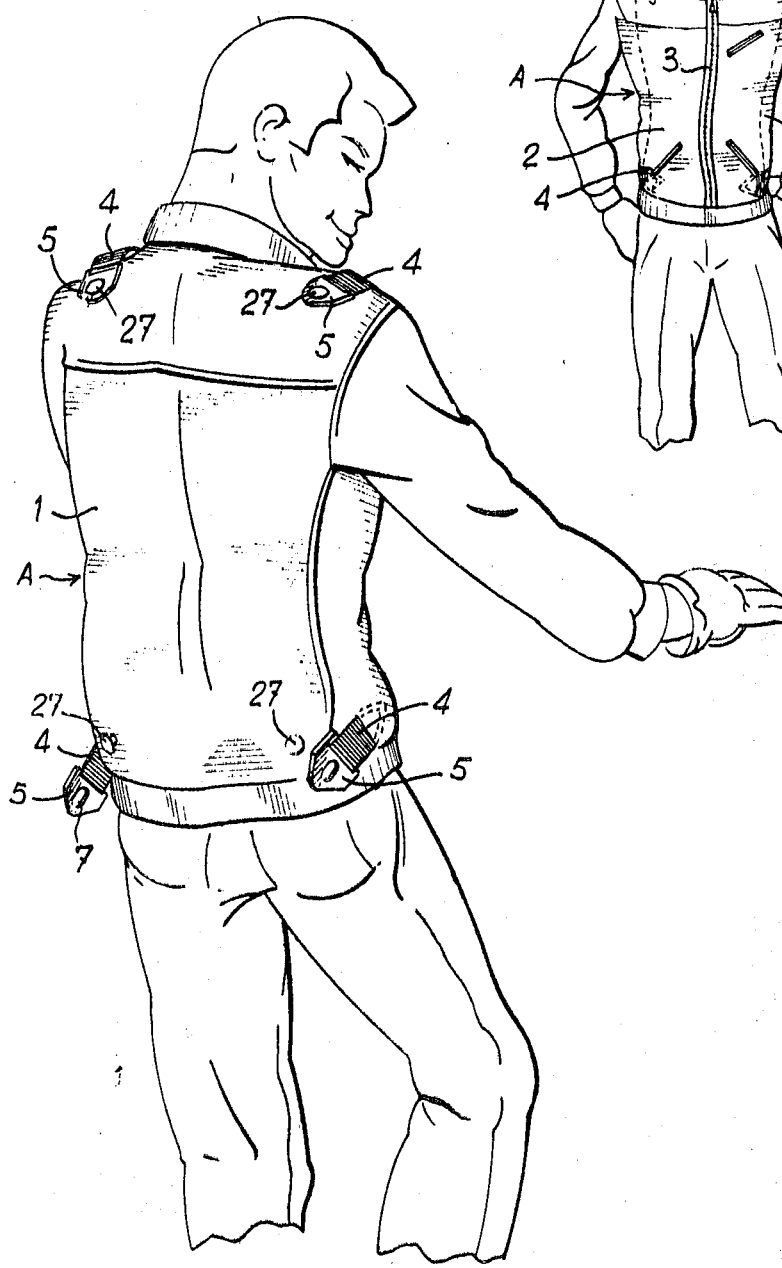
FIG. 1 is a perspective rear view of a jacket or windcheater arranged to constitute the removable part of a safety device according to the invention.

In the embodiment shown in FIGS. 1-6, the safety device according to the invention comprises the combination of a clothing element A, adapted to be worn by the user, detachable fixing means B for fixing the clothing element to the backrest *a* of the seat on which the user is intended to be seated, and a single actuating device C for releasing the clothing element A from the devices B provided to hold it against the backrest *a*.

In the presently-described embodiment, the clothing element A consists of a conventional jacket or windcheater comprising a back portion 1 and two front portions 2 capable of being interconnected by an openable closing means, for example a slide fastener device 3, this device being strong enough to withstand the traction forces produced upon the impact of the vehicle and also constituting a safety device which, by the opening thereof, allows the user to very quickly rid himself of the jacket.

This jacket or windcheater can be of leather, synthetic material, or fabric. It is such as to be capable of withstanding high tensile forces without tearing.

The jacket comprises in the four corners of the front portion, when the jacket is closed by the fastener 3, four short straps 4 two of which are disposed on the shoulders and two at the level of the belt. Each of these straps has a length of a few centimetres and terminates in an end element 5. This element consists of a rigid plate (see in particular FIG. 5) having two apertures 6 and 7, the aperture 6 allowing the strap 4 to be fixed to the plate, this strap forming for example a loop 8 passing through the aperture 6.

The other aperture 7 is provided for hooking the end element 5 of one of the fixing devices B to the backrest *a*, the end element 5 constituting in fact the keeper and each of the devices B constituting the complementary part of the lock that this part forms with the keeper.

With reference now to FIGS. 4 and 5, the device B of each lock comprises a rigid box 9 provided with a front entrance 10 for the passage of the keeper 5. This box has the shape of a rearwardly or inwardly divergent funnel and its larger base is fixed to the framework of the seat by any means (not shown), for example by welding, screws or other means.

Mounted in the box 9 to pivot about a transverse pin 11 is a bolt 12 whose protruding portion 13 is adapted to engage in the aperture 7 of the keeper 5 and retain the keeper in the box 9 by its rear face 14 which is plane and roughly perpendicular to the large faces of the keeper, the front face 14*a* being inclined.

The bolt 12 is biased towards the locking position, in which the protruding portion 13 is engaged in the aperture 7 of the keeper, by a spring 15 which bears against the end of the box 9 and against the bolt 12 with which it is held engaged by a lug or projection 16.

The bolt 12 of each device B is connected to the single actuating device C in such manner that by actuation of the device C it is possible to withdraw all the bolts 12 simultaneously so as to release all the keepers 5. For this purpose, each bolt is connected to the device C by a cable 17 in a sheath 18. One of the ends of the cables 17 extends through the bolt and terminates in an enlarged portion 19 so that the cable can pivot this bolt downwardly when a force is exerted on this cable in the direction of arrow f1 (FIGS. 4 and 5).

The sheath 18 bears at one end, 20, against the box 9 of the lock whereas the other end of the sheath bears against a fixed plate 21 in the device C. The corresponding ends of the four cables 17 are each engaged in a slot 22 of a bar 23 and this cable is retained in the slot 22 by an enlarged end portion 24 engaged in a cavity at the end of this slot.

The bar 23 is fixed to one end of an arm 25 of a lever integral with an actuating lever 26 which is mounted to pivot about the axis X—X in a bearing 27 integral with the framework of the seat proper $b$, the assembly 23-25-26-27 constituting the single actuating device C.

It is sufficient to pivot the lever 26 in the direction of arrow f2 (FIGS. 4-6) about the axis X—X to produce a traction on the cable 17 through the bar 23 in the direction of arrow f1 (FIGS. 4 and 5) and thus pivot the bolts 12 in opposition to the action of the springs 15 and simultaneously release the four keepers 5 and release the clothing element A from the backrest $a$ of the seat.

It will be observed that the clothing element A comprises, in the vicinity of the straps, four buttons 27 (see FIG. 1) to which the keepers 5 carried by the ends of the short straps 4 can be fixed, when the user wearing the jacket is out of the vehicle before he takes his place on the seat or after having left the latter.

Figure 3:
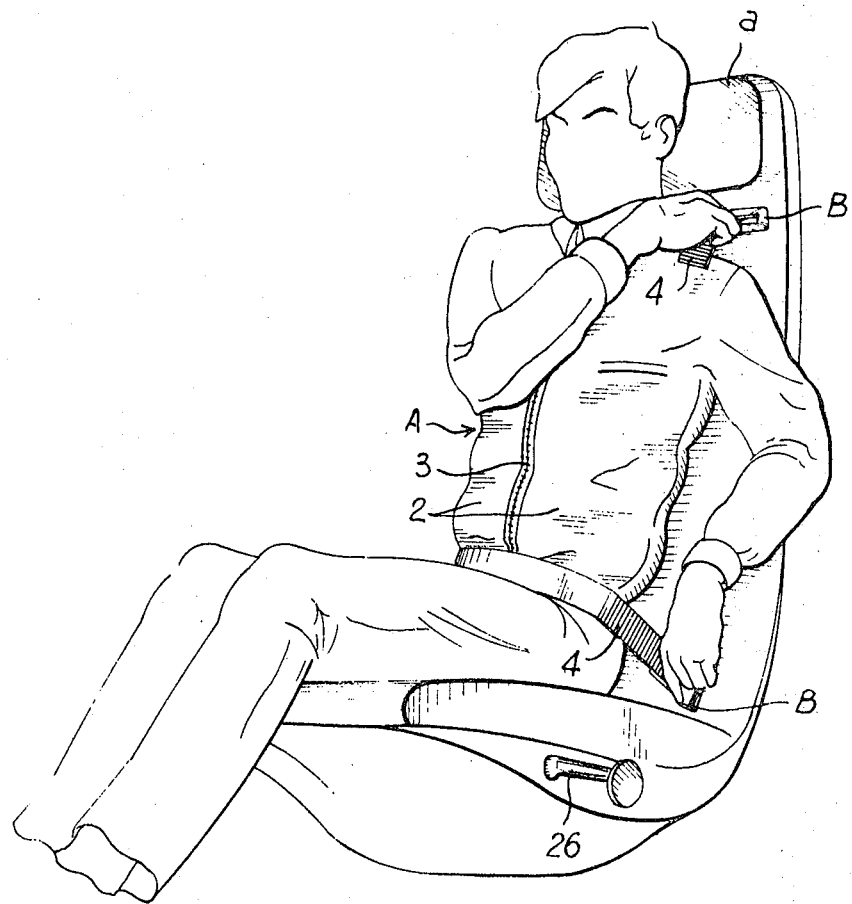
FIG. 3 shows the user wearing the jacket seated on a seat in the course of fixing the straps of this jacket to the complementary devices provided on the seat backrest.

When the user desires to travel in the vehicle, he detaches the four keepers 5 from the buttons 27 and, after having seated himself as shown in FIG. 3, he engages each keeper 5 successively in the complementary device B of the corresponding lock. He pushes on the keeper which slides on the front inclined face 14a of the projection 13 of the bolt and temporarily retracts this bolt in opposition to the action of the return springs 15 and, at the end of the engagement, the bolt automatically engages in the aperture 7 of the keeper under the action of the spring. The corresponding strap is thus locked to the backrest $a$ of the seat.

As soon as the four straps have thus been attached, the user is perfectly attached to the seat so that, in the event of a brutal impact, this passenger is perfectly maintained against the seat, the pressure exerted on him being distributed over the whole of his chest by the whole of the front portion 2 of the jacket. The fastener 3 of the jacket is strong enough to prevent the separation of the two portions 2 under the action of the high forces exerted thereon.

Consequently, the user is not subject to excessive localized pressures, these pressures being in any case much less than those he would be subjected to on the part of conventional safety belts. Moreover, the lock devices B are within his reach when he is seated on his seat and the user has absolutely no reason not to adjust himself to the seat.

The device according to the invention is perfectly convenient to employ and reliable in operation.

Figure 7:
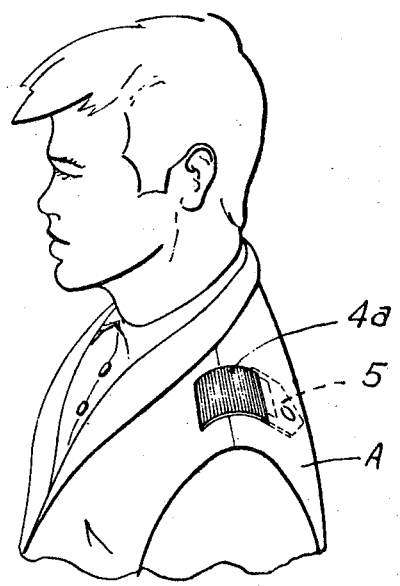
FIGS. 7 and 8 are partial perspective views of a modification of the jacket shown in FIGS. 1-3.
Figure 8:
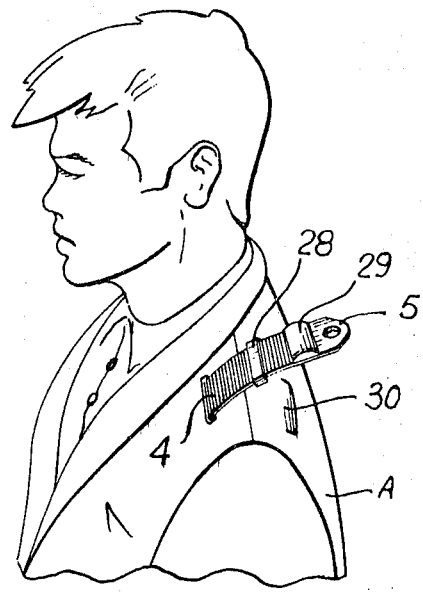

With reference to FIGS. 7 and 8 which show a modification of the construction of the jacket or windcheater, the straps 4a are adjustable in length by means of conventional devices 28 and 29, and, formed in the back part of the jacket, are slits 30 in which, at rest, it is possible to engage the keepers 5, as shown in FIG. 7, these slits 30 replacing the buttons 27 of the first embodiment.

FIG. 9 shows a modification A1 of the clothing element which is restricted in fact to a plastron adapted to a whole or a part of the chest and abdomen of the user, this plastron being provided in each of its corners with straps 4 adjustable in length by sliding in fittings 31 of known type for adjusting straps, belts or bands.

FIG. 10 shows a similar clothing element A2 consisting of a plastron for a woman. This plastron is cut away in the upper part at 32 so as to avoid compressing the bust of the user and is extended by braces 32 interconnected by a transverse strip 33. The braces are provided at points adjacent said strip with two upper straps 4 adapted to be hooked by their keepers to the device B for fixing to the seat. In the lower part, the two straps 4 are adjustable by means of fittings 31 similar to those of the preceding embodiment and carried by the plastron.

Having now described my invention what I claim as new and desire to secure by Letters Patent is:

1. An individual safety device for a user who is seated on a seat of a vehicle having a backrest, said device comprising in combination: a clothing element for said user and having four corners, four short straps respectively in said corners, each strap terminating at its free end in a fixing end element constituting a keeper, four locking devices which are permanently disposed on the backrest of the seat of the vehicle and which are complementary to said end elements for detachably fixing the latter to the seat, each locking device comprising a withdrawable locking element, and spring return means urging said locking element towards its locking position, actuating means including a single actuating member being provided for withdrawing simultaneously said locking elements and release said end elements of the straps.

2. A device as claimed in claim 1, wherein the withdrawable locking members are biased by springs to the locking position and each of said locking members is connected by a cable in a sheath to a common traction element carried by a crank which is integral with an actuating lever pivotably mounted on the support of the seat of the vehicle.

3. A device as claimed in claim 1, wherein the clothing element is a jacket.

4. A device as claimed in claim 1, wherein the clothing element is a simple plastron.

5. A device as claimed in claim 3, comprising means on the clothing element for holding the end elements of the straps in position when the user is wearing said clothing element away from the seat of the vehicle.

References Cited

UNITED STATES PATENTS

| 1,376,625 | 5/1921 | Johnston | 297—390 X |
| 2,819,095 | 1/1958 | Haltmar | 297—385 |
| 3,179,360 | 4/1965 | Shelton et al. | 244—122.2 |
| 3,316,017 | 4/1967 | Knight | 297—385 |

JAMES T. McCALL, Primary Examiner

U.S. Cl. X.R.

280—150

UNITED STATES PATENT OFFICE
CERTIFICATE OF CORRECTION

Patent No. 3,524,679          Dated August 18, 1970

Inventor(s) Hubert Y. de Lavenne

It is certified that error appears in the above-identified patent and that said Letters Patent are hereby corrected as shown below:

In column 1, line 7, after "Ser. No. 721,218" insert

--Claims priority, application France June 14, 1967, No. 110,227--.

Signed and sealed this 9th day of November 1971.

(SEAL)
Attest

EDWARD M. FLETCHER, JR.
Attesting Officer

ROBERT GOTTSCHALK
Acting Commissioner of Patents